UNITED STATES PATENT OFFICE.

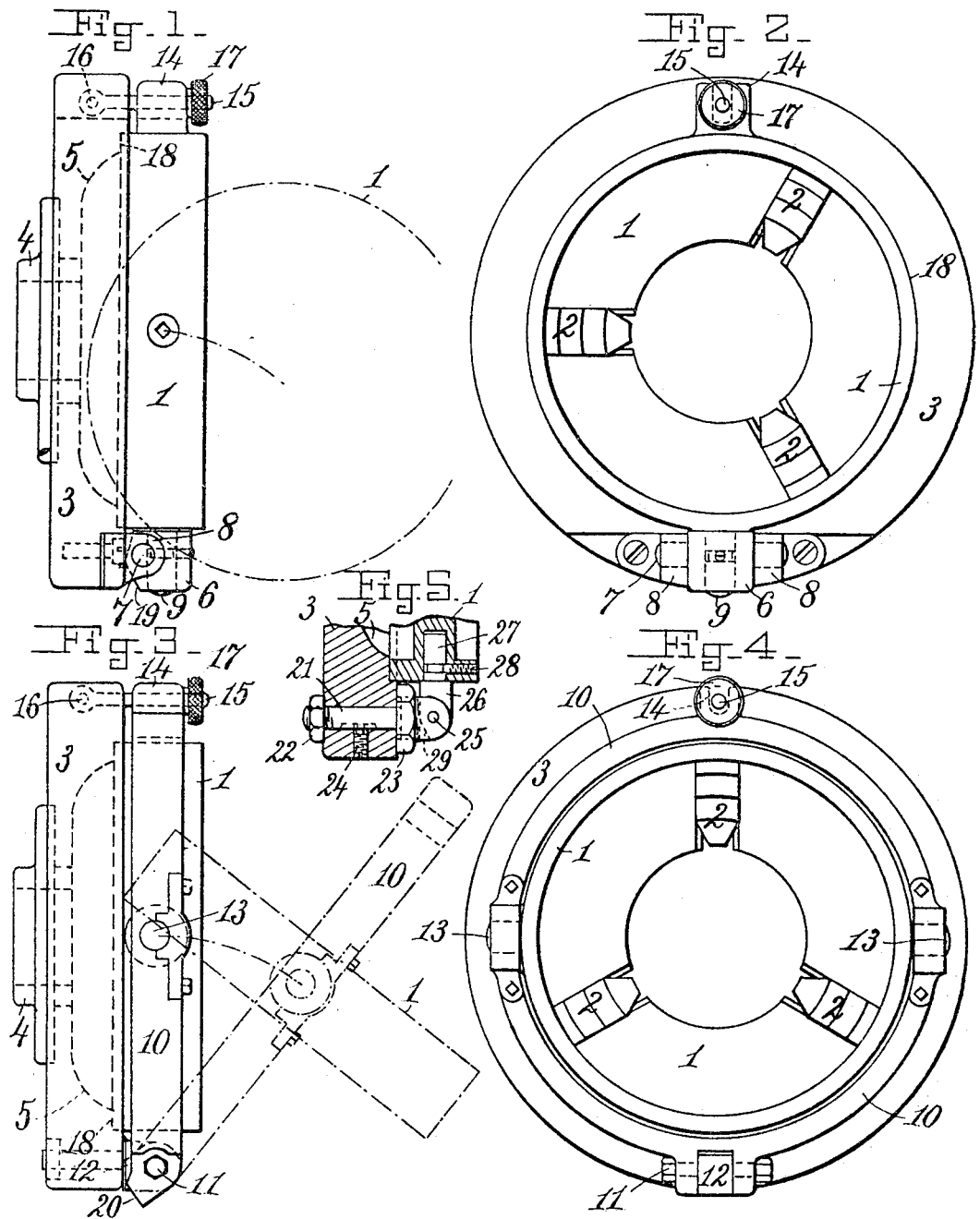

DANIEL E. KEMPSTER, OF BOSTON, MASSACHUSETTS.

REVERSIBLE CHUCK.

No. 799,006. Specification of Letters Patent. Patented Sept. 5, 1905.

Application filed February 16, 1903. Renewed February 6, 1905. Serial No. 244,356.

*To all whom it may concern:*

Be it known that I, DANIEL E. KEMPSTER, of Boston, in the county of Suffolk and State of Massachusetts, have invented certain new and useful Improvements in Reversible Chucks, of which the following is a specification.

This invention relates to improvements in reversible chucks in which the article may be clamped or held and may be turned end for end, so that work may be performed on opposite ends of the article without removing it from the chuck and the surfaces on opposite ends of the article worked upon will be concentric and true.

The invention has for its objects to provide novel, convenient, and simple means whereby the article may be turned very quickly and will be as near as possible to the head-stock of the lathe or other machine on which the improved chuck is to be used while the work is being performed.

The invention consists of the novel construction, arrangement, and combination of parts, as will be fully described hereinafter, and it is carried out substantially as illustrated on the accompanying drawings, which form an essential part of this specification, and whereon like characters of reference refer to like parts wherever they occur.

On the drawings, Figure 1 represents a side elevation of one arrangement of my improved chuck, showing in construction-lines the position of the chuck while it is being reversed. Fig. 2 represents a front elevation of the chuck shown in Fig. 1. Fig. 3 represents a side elevation of another arrangement of the improved chuck, also showing in construction-lines the position of the parts while the chuck is being reversed. Fig. 4 represents a front elevation of the chuck shown in Fig. 3. Fig. 5 represents a detail view of one form of joint which may be used to allow the chuck to be reversed.

The chuck proper which is to be used with my improved reversing mechanism may be of any of the common and well-known forms of open or ring chucks, and therefore I shall not enter into a minute description of its construction, but will simply say that it consists of a body portion 1 having radiating jaws 2 mounted upon the body portion in such a manner that they are movable radially toward and from the center of the chuck by any of the common and well-known means now in use for that purpose, but which are preferably of the universal construction whereby the jaws all are moved in unison, and therefore keep at a uniform distance from the center of the chuck.

A face-plate 3, having means, as the removable flanged collar 4, on the back thereof to attach said face-plate to the spindle of the lathe or other machine on which the chuck is to be used, is preferably provided in its face with a chamber 5 (shown by dotted lines in Figs. 1 and 3) and for a purpose to be understood by the completed description of the device. The chuck-body 1 is adjustably secured to the face-plate 3 by means of a chuck-holding device, which may be in the form of a block 6, pivoted at 7 to a bracket 8, secured to the face-plate and forming a bearing for the trunnion 9 on the chuck-body, which is rotatably mounted on the block 6, as shown in Figs. 1 and 2, or said chuck-body may be adjustably secured to the face-plate by means of a ring-shaped block 10, pivotally attached at 11 to an ear 12, made in one piece with or secured to the face-plate and having the trunnions 13 13 on opposite sides of the chuck-body rotatably mounted in bearings on the ring-shaped block 10, as shown in Figs. 3 and 4. By these connections between the face-plate 3 and the body portion 1 of the chuck it will be seen that the chuck-body may be swung outward away from the face-plate by turning the block 6 upon its journals 7, as shown in Fig. 1, or the block 10 upon its journal 11, as shown in Fig. 3, and when said chuck-body is swung outward sufficiently said body may be turned upon its trunnion 9, as shown in Fig 1, or upon its trunnions 13 13, as shown in Fig. 3, so as to reverse the exposed surface of the chuck-body, thereby turning any article end for end which may be held by the clamping-jaws of the chuck.

The chuck-body 1, as shown in Figs. 1 and 2, or the ring-shaped block 10, as shown in Figs. 3 and 4, are provided with a forked projection 14, which in connecting with a screw-threaded rod 15, pivoted at 16 to the face-plate, and a thumb-nut 17 on said rod, tends to clamp and hold the inner surface of the chuck-body 1 in contact with the surface of the face-plate. The surface of the face-plate against which the chuck-body is held is preferably provided with a recess 18, (shown by dotted lines in Figs. 1 and 3,) which recess is of proper size and shape to fit the chuck-body. By this means the chuck-body is always brought to a proper position when clamped to the face-plate by the screw-rod 15 and nut 17, the recess 18 acting to assist in preventing the movement of the chuck upon the face-plate.

In order to limit the forward movement of the chuck-body when turned upon the journal 7 of the block 6 or upon the journal 11 of the block 10, I provide said blocks with the respective surfaces 19 and 20, which engage, respectively, the surface of the bracket 8 and the face-plate 3, and which therefore form stops to limit the outward movement of the chuck.

In Fig. 5 I have shown a form of the connecting device between the chuck-body 1 and the face-plate 3 which is the preferred manner of forming said connection, as it is very simple and inexpensive to make, while at the same time it accomplishes all that is accomplished by the other constructions shown.

In the construction shown in Fig. 5 I use a stud 21, which is adjustable longitudinally within a perforation in the face-plate 3 by means of the nuts 22 and 23, adjustable upon screw-threads upon the extension of said stud, so as to clamp the face-plate on opposite sides thereof. This stud 21 is prevented from turning within the face-plate by the screw 24, which enters a keyway on the stud. To the other end of the stud 21 at 25 is pivotally attached the block 26, the free end of which forms a pin 27, which enters a recess in the chuck-body 1 and upon which the chuck-body may swivel when the block 26 is turned outward upon its pivotal connection to the stud 21. A screw 28, in connection with a groove upon the pin 27, prevents the chuck-body from being accidentally withdrawn from the pin. The block 26 is provided with a surface 29 (shown in dotted lines on the drawings) and by which the outward movement of the block and the chuck-body carried thereby are limited. The operation of this construction of the connection between the chuck-body and the face-plate is the same as that of the construction shown in Figs. 1 and 2, the chuck-body swinging outward from the face-plate upon the pivotal connection of the block 26 to the stud 21 at 25 and the chuck-body rotating upon the pin 27 in order to reverse the exposed face of the chuck-body.

From the foregoing descriptions of the connections between the chuck-body and the face-plate it will be seen that there is a combined hinge and swivel joint formed, whereby the chuck-body may be first swung outward from the face-plate, then turned to swivel bodily upon itself, and finally swung back into position against the face-plate, with either of its sides exposed, as desired. This reversing of the exposed faces of the chuck-body is very easily and quickly done and while held by the chuck may be operated upon at opposite ends without removing them from the chuck, and thus forming surfaces which will be perfectly concentric and true.

My improved chuck is very easy of operation and is held very firmly in place when work is being done upon the articles held thereby, as the holding-jaws are very near the headstock of the lathe or other machine on which the chuck is used and there is consequently less liability for the chuck or article to vibrate.

Having thus fully described the nature, construction, and operation of my invention, I wish to secure by Letters Patent and claim—

1. In a reversible chuck, a chuck-body with radiating jaws thereon to hold the work, a face-plate having means to attach it to the spindle of the lathe or other machine on which it is to be used, a block journaled to the face-plate near one edge of said plate, and having the chuck journaled to said block, and means to clamp the chuck against the face of the face-plate, whereby the chuck-body may be swung bodily outward from the face-plate and reversed.

2. In a reversible chuck, a chuck-body having radiating jaws thereon to hold the work, a face-plate recessed to receive the chuck-body and having means to attach it to the spindle of the machine on which it is used, a block journaled to said face-plate near one edge of said plate, and having the chuck-body pivotally attached to said block, and means to clamp the chuck-body against the face of the face-plate within said recess, whereby the chuck-body may be swung bodily outward from the face-plate and reversed.

3. In a reversible chuck, a chuck-body having radiating jaws thereon to hold the work, a face-plate having means to attach it to the spindle of the machine on which it is used, a block journaled to said face-plate near one edge of said plate and having the chuck-body pivotally attached to said block, a screw-threaded rod, a nut on said rod, and a forked projection to receive said rod, whereby the chuck-body may be clamped firmly against the face-plate, whereby the chuck-body may be swung bodily outward from the face-plate and reversed.

4. In a reversible chuck, a chuck-body having jaws to clamp and hold the work, a face-plate having means to attach it to the machine on which it is to be used, a block journaled to the face-plate near one edge of said plate and having the chuck-body journaled to said block at right angles to the journal of the block to the face-plate, and means to clamp and hold the chuck-body against the face-plate, whereby the chuck-body may be swung bodily outward from the face-plate and reversed.

5. In a reversible chuck, a face-plate having means to attach it to a lathe or other machine on which it is to be used, an open or ring-shaped chuck-body having clamping-jaws thereon, a block hinged to the face-plate near one edge of said plate carrying said chuck-body rotatably mounted thereon, and means to clamp the chuck-body against the face-plate, whereby the chuck-body may be swung bodily outward from the face-plate and reversed.

6. In a reversible chuck, a face-plate having means to attach it to a lathe or other machine on which it is to be used, a chuck-body having means to hold the work to be operated upon connected to the face-plate by a joint permitting the chuck-body to be swung away from the face-plate and rotated to present opposite faces thereof and means to clamp the chuck-body against the face-plate.

7. In a reversible chuck, a face-plate having means to attach it to a lathe or other machine on which it is to be used, a chuck-body having means to hold the work to be operated upon, a combined hinged joint between the chuck-body and face-plate whereby the chuck-body may be swung outward from the face-plate and then turned upon itself to expose opposite sides thereof, and means to clamp the chuck-body against the face-plate.

In testimony whereof I have affixed my signature in presence of two witnesses.

DANIEL E. KEMPSTER.

Witnesses:
HENRY CHADBOURN,
ARTHUR C. JONES.